Nov. 28, 1933.　　　D. G. ADAMS　　　1,937,106
LUBRICATING APPARATUS
Filed Oct. 7, 1930
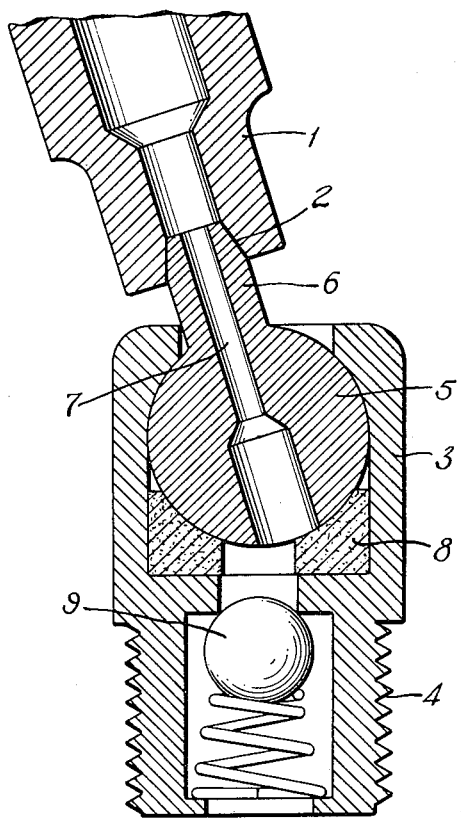
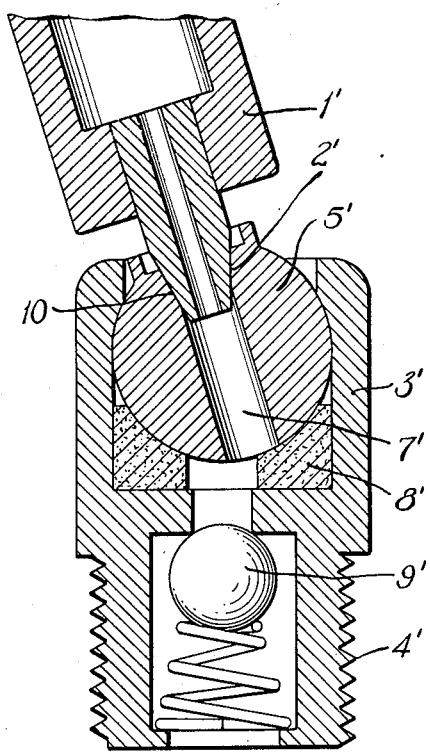
INVENTOR
Daniel G. Adams
BY
Fiddle, Margeson and Homidge
ATTORNEYS Patented Nov. 28, 1933

1,937,106

UNITED STATES PATENT OFFICE 1,937,106

LUBRICATING APPARATUS

Daniel G. Adams, New York, N. Y., assignor to Adams Grease Gun Corporation, New York, N. Y., a corporation of New York Application October 7, 1930. Serial No. 486,895

3 Claims. (Cl. 184—105)

This invention relates to lubricating fittings, and is particularly directed to fitting so constructed and arranged that the grease gun by which grease is supplied under pressure to the fittings may be held at different angles when applying grease to the parts to be lubricated.

In the past, due to the setting of the various grease cups or other fittings on motor vehicles or other machinery to be lubricated, difficulty has been experienced in supplying grease to these fittings because of the angles at which the gun must be held.

It is an object of my invention, therefore, to provide fittings so constructed and arranged that guns of various types can be applied to the fittings and held at various angles while grease is being supplied to the fittings.

In the drawing:

Fig. 1 is a sectional view of one form of fitting embodying my invention; and

Fig. 2 is a sectional view of another form of fitting.

Referring to the drawing in detail and first of all to Fig. 1 wherein I have illustrated a fitting adapted for use in connection with a gun having a nozzle or tip designated 1 which is provided with a tapered bore 2. This fitting designated 3 is screw threaded at 4 whereby the same may be screwed into the part to be lubricated. The other end of the fitting is provided with an oscillatable spherical member in the form of a ball 5 provided with a tapered tit or extension 6 for receiving the tapered bore 2 of the grease gun nozzle 1. The ball 5 is bored as shown at 7 for the passage of grease therethrough, packed at 8, and grease passing therethrough unseats the spring loaded check valve 9 with which the fitting is provided to permit the grease to discharge into the bearing or other part to be lubricated.

In Fig. 2 I have illustrated a fitting adapted for use in connection with a gun having a nozzle or tip designated 1' which is provided with a tapered tip 2' instead of a tapered bore as shown in Fig. 1. This fitting comprises a body portion 3' screw threaded into the part to be lubricated. The other end of this fitting is provided with an oscillatable spherical member in the form of a ball 5' provided with a bore 7' to permit of passage of grease therethrough. The outer end of this bore is tapered as shown at 10 to receive the tapered tip 2' of the grease gun nozzle 1'. Packing 8' is provided in this fitting as in the fitting illustrated in Fig. 1. This fitting like the form shown in Fig. 1, is provided with a spring loaded check valve 9'.

From the foregoing it will be appreciated that I have provided a lubricating fitting whereby grease may be supplied to a bearing even though the fitting at the bearing may be installed at an awkward angle, the fitting being so constructed as to enable the gun to be operated even though the same be held at an angle to the fitting instead of in line therewith as is necessary with previous fittings.

It will be appreciated also that while I have shown and described two embodiments of my invention it is to be understood that these constructions may be changed in their details without departing from the spirit and scope of my invention.

What I claim is:—

1. A lubricating fitting comprising in combination a part to be attached to the apparatus to be lubricated, and a spherical nipple mounted for universal movement in the receiving end of said fitting.

2. A lubricating fitting comprising in combination a part to be attached to the apparatus to be lubricated, and an oscillatable spherical nipple in the receiving end of said part, said nipple being bored to permit of the passage of a lubricant therethrough, the receiving end of said bore flaring outwardly.

3. A lubricating fitting comprising in combination a part to be attached to the apparatus to be lubricated, an oscillatable spherical nipple in the receiving end of said fitting part, and a tit integral with said nipple and projecting outwardly of the fitting and nipple.

DANIEL G. ADAMS.